United States Patent
Scheessele (10) Patent No.: US 10,802,860 B2
(45) Date of Patent: Oct. 13, 2020

(54) CLOUD PLATFORM OS MANAGEMENT

(71) Applicant: HEWLETT-PACKARD DEVELOPMENT COMPANY, L.P., Houston, TX (US)

(72) Inventor: Evan Scheessele, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 363 days.

(21) Appl. No.: 15/748,035

(22) PCT Filed: Oct. 26, 2015

(86) PCT No.: PCT/US2015/057391
§ 371 (c)(1),
(2) Date: Jan. 26, 2018

(87) PCT Pub. No.: WO2017/074303
PCT Pub. Date: May 4, 2017

(65) Prior Publication Data
US 2018/0225138 A1    Aug. 9, 2018

(51) Int. Cl.
*G06F 9/455* (2018.01)
*G06F 8/61* (2018.01)
(Continued)

(52) U.S. Cl.
CPC ............ *G06F 9/45558* (2013.01); *G06F 8/63* (2013.01); *G06F 8/65* (2013.01); *G06F 8/71* (2013.01);
(Continued)

(58) Field of Classification Search
CPC .......... G06F 9/45558; G06F 8/63; G06F 8/65; G06F 8/71; G06F 9/44; G06F 9/455; G06F 9/5072; G06F 9/45533; G06F 2009/45595
See application file for complete search history.

(56) References Cited

U.S. PATENT DOCUMENTS 8,813,076 B2    8/2014    Anderson et al.
8,909,767 B2    12/2014   Sunkara et al.
(Continued)

FOREIGN PATENT DOCUMENTS

KR    10-2011-0103669 A    9/2011

OTHER PUBLICATIONS

Phapoom, et al. Foundations and Technological Landscape of Cloud Computing. Hindawi Publishing. ISRN Software Engineering. vol. 2013. Article ID 762174, 31 pages.
(Continued)

*Primary Examiner* — Wissam Rashid
(74) *Attorney, Agent, or Firm* — Trop Rea Bentley & Kim LLC (57) ABSTRACT

The present disclosure broadly discloses an operating system (OS) management service for a cloud platform of a cloud provider (CP). The OS management service may be configured for receiving OS version information indicative of a plurality of OS versions of an OS available from an OS provider, receiving OS image information indicative of a plurality of OS images of the OS made available by the CP within the cloud platform, receiving VM OS information indicative of a plurality of VMs of the cloud platform that are running the OS available from the OS provider, and initiating a management action based on various combinations of the OS version information, the OS image information, and the VM OS information. The OS management service may be provided by an OS management server of the cloud platform, which may be implemented as a database server or other suitable system.

13 Claims, 4 Drawing Sheets

(51) Int. Cl.
*G06F 8/65* (2018.01)
*G06F 8/71* (2018.01)
*G06F 9/50* (2006.01)
*G06F 9/44* (2018.01)

(52) U.S. Cl.
CPC ............... *G06F 9/44* (2013.01); *G06F 9/455* (2013.01); *G06F 9/5072* (2013.01); *G06F 9/45533* (2013.01); *G06F 2009/45595* (2013.01)

(56) References Cited

U.S. PATENT DOCUMENTS

| | | |
|---|---|---|
| 2005/0188374 A1 | 8/2005 | Magenheimer |
| 2013/0047160 A1* | 2/2013 | Conover .................. G06F 8/65 718/1 |
| 2013/0122950 A1 | 5/2013 | McLeod et al. |
| 2014/0149494 A1 | 5/2014 | Markley et al. |
| 2014/0229939 A1 | 8/2014 | Dias de Assuncao et al. |
| 2015/0081910 A1 | 3/2015 | Assuncao et al. |
| 2015/0106396 A1 | 4/2015 | Poddar et al. |

OTHER PUBLICATIONS

Varia, Jinesh, Amazon Web Services—Architecting for the Cloud: Best Practices, Jan. 2011.

International Searching Authority., International Search Report and Written Opinion dated Aug. 22, 2016 for PCT Application No. PCT/US2015/057391, Filed Oct. 26, 2015, 13 pgs.

* cited by examiner

CLOUD PLATFORM OS MANAGEMENT

BACKGROUND

Cloud platforms provide virtualization environments which may support various applications and services, such as virtual desktops, virtual file systems, virtual network functions, or the like. The applications and services provided by cloud platforms are typically provided using virtual machines (VMs) running within the cloud platforms. The VMs running within the cloud platforms run operating systems (OSs).

DETAILED DESCRIPTION

The present disclosure broadly discloses an operating system (OS) management service for a cloud platform of a cloud provider (CP). The cloud platform of the CP is configured to support use of virtual machines (VMs). The OS management service may be configured for receiving OS version information indicative of a plurality of OS versions of an OS available from a OS provider, receiving OS image information indicative of a plurality of OS images of the OS made available by the CP within the cloud platform, receiving VM OS information indicative of a plurality of VMs of the cloud platform that are running the OS available from the OS provider, and initiating a management action based on various combinations of the OS version information, the OS image information, and the VM OS information. For example, a management action related to upgrading the OS images of the OS made available by the CP within the cloud platform may be initiated or performed based on the OS version information and the OS image information. For example, a management action related to upgrading the OSs of VMs of the cloud platform may be initiated or performed based on the OS version information, the OS image information, and the VM OS information. The OS management service may be provided by an OS management server of the cloud platform, which may be implemented as a database server or other system suitable for use in providing the OS management service.

Figure 1:
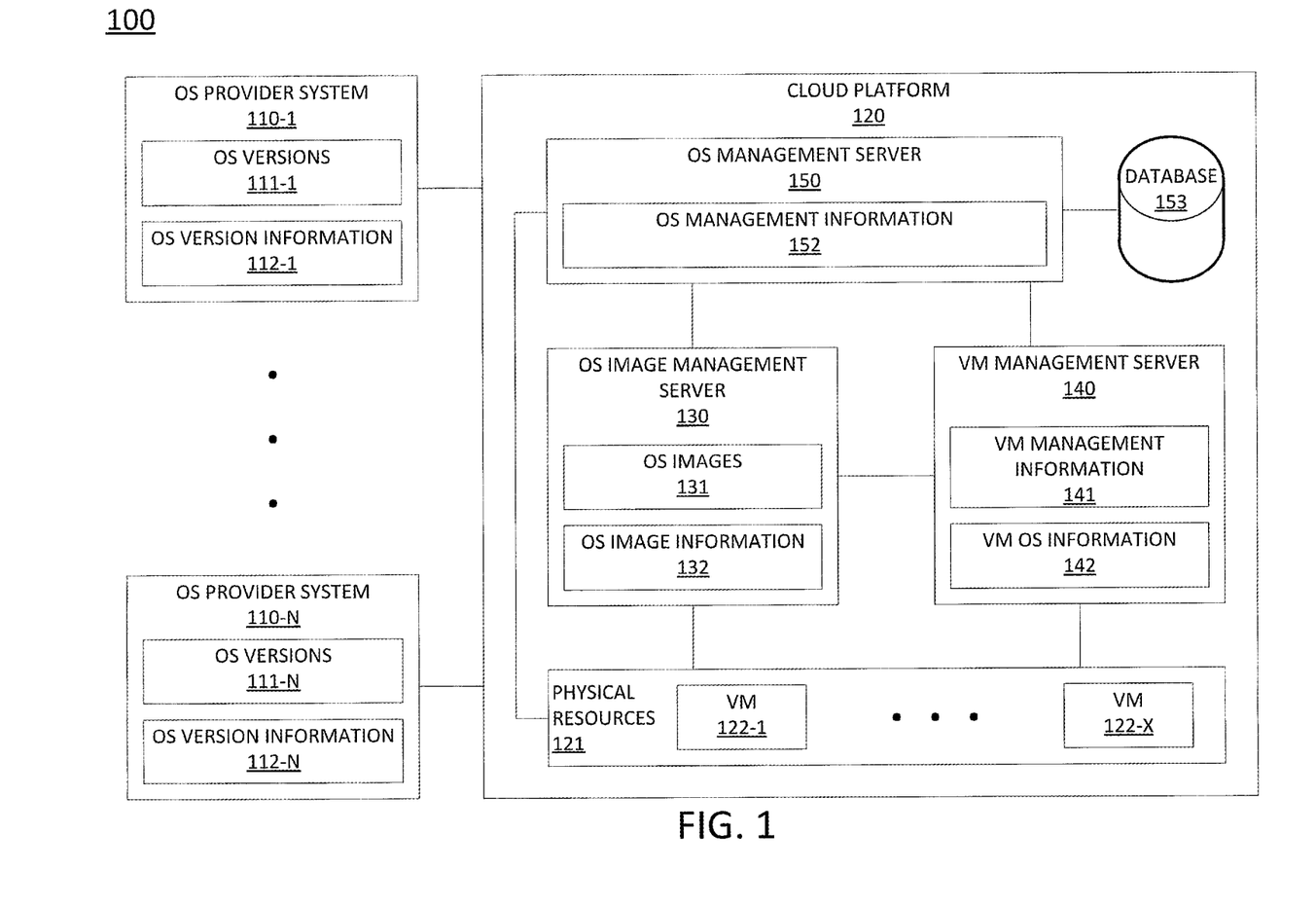
FIG. 1 is a block diagram of an example system including a cloud platform running an example OS management server of the present disclosure.

FIG. 1 is a block diagram of an example system including a cloud platform running an example OS management service of the present disclosure. For example, the system 100 includes a plurality of OS provider systems 110-1-110-N (collectively, OS provider systems 110) of respective OS providers and a cloud platform 120 of a cloud provider (CP). The cloud platform 120 includes physical resources (PRs) 121 hosting a plurality of VMs 122-1-122-X collectively, VMs 122), an OS image management server 130, a VM management server 140, and an OS management server 150.

The OS provider systems 110 of the OS providers are configured to make OSs available for use by customers. The OS provider system 110 of an OS provider may be configured to make one or more OSs of the OS provider available for use by customers. The OS provider system 110 of an OS provider, for a given OS offered by the OS provider, may make various OS versions of the OS available for use by customers (illustratively, OS versions 111-1-111-N of the respective OS provider systems 110-1-110-N, which may be referred to collectively as OS versions 111). It will be understood that the OS versions 111 of an OS of an OS provider may include OS releases, OS patches, or other types of OS versions of the OS which may be offered by the OS provider for the OS. The OS provider system 110 of an OS provider may make OS versions 111 available for download by customers, may send OS versions 111 to customers responsive to requests made by the customers, or the like. It will be understood that OS versions 111 may be provided to customers for free (e.g., patches, releases for open source OS providers, or the like), for a fee, or the like. The OS provider system 110 of an OS provider may be configured to provide OS version information 112 indicative of various OS versions 111 of OSs available from the OS provider (illustratively, OS version information 112-1-112-N of OS provider systems 110-1-110-N for the OS versions 111-1-111-N, respectively). The OS version information 112 may enable the OS provider to advertise, to customers and potential customers, various OS versions 111 of OSs available from the OS provider. The OS version information 112 indicative of the various OS versions 111 of the OS available from the OS provider may include, for each of the OS versions 111 of the OS available from the OS provider, information identifying the OS version 111 (e.g., version number or other identifying information), an indication of the date on which the OS version 111 was made available (or other temporal information), one or more details related to features of the OS version 111, or the like, as well as various combinations thereof. The one or more details related to features of the OS version 111 may include an identification of changes to the OS since a previous version of the OS (which may be referred to herein as a delta ($\Delta$) of the OS version). The OS version information 112 of the OS versions 111 of an OS provider may be made available by the OS provider system 110 in various ways (e.g., making the OS version information 112 available on the OS provider system 110 such that customers may request the OS version information 112, providing the OS version information 112 to customers who have registered to receive the OS version information 112 (e.g., periodically, when the OS version information 112 is updated, or the like), using one or more application programming interfaces (APIs), or the like, as well as various combinations thereof).

The PRs 121 of cloud platform 120 may include any physical resources of a cloud platform which may be used to support VMs 122. For example, the PRs 121 may include resources for use in hosting VMs 122, for use in supporting communications of VMs 122, or the like, as well as various combinations thereof. For example, the PRs 121 may include processors, memories, storage devices, input-output resources, networking resources (e.g., top-of-rack (ToR) switches, end-of-rack (EoR) switches, aggregating switches, routers, communication links, or the like), or the like.

The VMs 122 may be configured to provide various types of applications or services which may be hosted within a cloud platform. For example, VMs 122 may be configured to operate as virtual servers, virtual desktops, virtual file system managers, or the like. The VMs 122 may be configured to include various types of virtual resources, such as virtual processing resources, virtual memory resources, virtual storage resources, virtual networking resources, or the like, as well as various combinations thereof. As discussed further below, the VMs 122 run OSs, respectively, which may include various OS versions 111 of various OSs available from OS provider systems 110 of OS providers.

The OS image management server 130 may be configured to perform various OS image management functions for cloud platform 120. The OS image management server 130 may be configured to obtain OS versions 111 of OSs from OS providers (e.g., from the OS provider systems 110) and make the obtained OS versions 111 available for use within the cloud platform 120 as OS images (illustratively, OS images 131). In other words, generally speaking, an OS image 131 available from OS image management server 131 is an image of an OS version 111 available from one of the OS provider systems 110. It will be appreciated that the OP of cloud platform 120 may not obtain every OS version 111 of every OS available from the OS providers of the OS provider systems 110 and, thus, that the set of OS images 131 made available by OS image management server 130 is likely to be different than the set of OS versions 111 made available by the OS providers of the OS provider systems 110. For example, while OS provider may offer an OS and may have released versions 1.0, 1.1, 1.2, 2.0, 3.0, 3.0.1, and 4.0 of that OS via its OS provider system 110, the CP of cloud platform 120 may have only obtained versions 1.0, 1.2, and 3.0 of the OS and, thus, OS image Management server 130 may only be maintaining OS images 131 for versions 1.0, 1.2, and 3.0. The OS image management server 130 also may be configured to make OS images 131 available for use by VM management server 140 in configuring VMs 122 within cloud platform 120 (as discussed further below). The OS image management server 130 may be configured to maintain OS image information 132 for the OS images 131 available from OS image management server 130. The OS image information 132 may include information identifying each of the OS images available from OS image management server 130. The OS image information 132 may include, for each of the OS images 131 available from the OS image management server 130, an indication of the OS version 111 of the OS image 131 (e.g., the version number of the OS), an indication of the date on which the OS image 131 was obtained from the OS provider, an indication of the date on, which the OS image 131 was made available for use within the cloud platform 120, or the like, as well as various combinations thereof. The OS image management server 130 may be configured to maintain OS images 131 and OS image information 132 using a database (e.g., OS image management server 130 may be implemented as a database server) or using any other suitable type(s) of storage device(s), which have been omitted from FIG. 1 for purposes of clarity.

The VM management server 140 may be configured to perform various VM management functions for cloud platform 120. The VM management functions may include instantiation of new VMs 122, termination of existing VMs 122, or the like. It will be understood that instantiation of new VMs 122 and termination of existing VMs 122 may be performed responsive to various events or conditions (e.g., responsive to customer requests, responsive to load information, or the like). The instantiation of a new VM 122 within the cloud platform 120 may include various configuration actions, including configuration of the VM 122 to have an OS running thereon. The configuration of a VM 122 to have an OS running thereon may be performed by determining which OS will run on the VM 122 (e.g., based on OS image information 132 available from OS image management server 130), determining which OS version 111 of the OS will run on the VM 122 (e.g., based on OS image information 132 available from the OS image management server 130), accessing an OS image 131 of the OS version 111 of the OS that will run on the VM 122 (e.g., from OS image management server 130), and configuring the VM 122 to have the OS image 131 (and, thus, the OS version 111 of the OS) running thereon. The VM management server 140 may be configured to maintain VM management information 141 related to management of VMs 122 (e.g., non-OS related VM management information such as VM customer information, VM configuration information, or the like). The VM management server 140 may be configured to maintain VM OS information 142. The VM OS information 142 may include, for each of the VMs 122 of the cloud platform, an indication of the OS version 111 originally configured on the VM 122 at the time of instantiation of the VM 122 (e.g., the version number of the OS, an indication of a date on which the VM 122 was instantiated where the date may be used to determine the OS version 111 originally configured on the VM 122 at the time of instantiation of the VM 122, or the like), an indication of the OS version 111 that is currently running on the VM 122 (e.g., if the OS running on the VM 122 has been updated since the VM 122 was instantiated), or the like, as well as various combinations thereof. The VM management server 140 may be configured to maintain the VM management information 141 and the VM OS information 142 using a database (e.g., VM management server 140 may be implemented as a database server) or using any other suitable type(s) of storage device(s), which have been omitted from FIG. 1 for purposes of clarity.

The OS management server 150 is configured to provide various OS management functions within the cloud platform 120. The OS management server 150 may be configured to initiate various management actions for managing as within cloud platform 120 (e.g., managing the OS images 131 available from OS image management server 130, managing the OSs being run by VMs 122, or the like, as well as various combinations thereof) based on the analysis of information associated with use of OSs by VMs 122 within cloud platform 120 (e.g., based on one or more of OS version information 112, OS image information 132, and VM OS information 142). The OS management server 150 may produce OS management information 152 in conjunction with providing OS management functions within the cloud platform 120. The OS management information 152 may include various types of information which may be received by OS management server 150 for use in initiating management actions and various types of information which may be determined or generated based on initiation of management actions by OS management server 150, as discussed further below.

The OS management server 150 may be configured to receive OS version information 112 from OS provider systems 110, receive OS image information 132 from OS image management server 130, receive VM OS information 142 from VM management server 140, and initiate a management action based on the OS version information 112, the OS image information 132, and the VM OS information 142. The management action may include an action related to the OS images available from OS image management server 130, an action related to VMs 122 running in the cloud platform 120, or the like. An example method is depicted and described with respect to FIG. 3.

The OS management server 150 may be configured to receive OS version information 112 from OS provider systems 110, receive OS image information 132 from OS image management server 130, and initiate a management action based on the OS version information 112 and the OS image information 132. The management action may include an action related to the OS images available from OS image management server.

The management action initiated by OS management server 150, as discussed above, may include a management action related to the OS images 131 available from OS image management server 130. For example, the management action may include initiating an audit of the current state (e.g., level of staleness) of OS images 131 available from the OS image management server 130 (e.g., for one OS, for all OSs, or the like), prioritizing auditing of the current state of OS images 131 available from the OS image management server 130, prioritizing OSs for which OS images 131 are available from the OS image management, server 130 (e.g., in a manner for indicating which of the OS images 131 are most out-of-date (or stale) with respect to the respective OS, versions 111 available from OS provider systems 110), initiating automatic upgrades to OS images 131 available from the OS image management server 130 (e.g., by requesting the latest OS versions 111 of the OSs from OS provider systems 110 for making the latest OS versions 111 of the OSs available as OS images 131), generating information indicative of the current state of OS images 131 available from the OS image management server 130 (e.g., current versions of the OS images 131, level of staleness of the OS images 131 relative to respective OS versions 111 available from OS provider systems 110 for respective OSs, or the like), initiating a notification (e.g., initiating display of a message or alert on a workstation of a technician or other user of cloud platform 120, sending a text message or e-mail message to a technician or other user of cloud platform 120, or the like) for providing a technician or other user associated with cloud platform 120 with information related to the OS images 131 available within the cloud platform 120 (e.g., prioritizing OSs based on staleness of OS images 131, identification of OSs requiring or potentially requiring upgrades, or the like), or the like, as well as various combinations thereof. The management action may include various combinations of management actions described above (e.g., prioritizing audits to be performed and then performing audits based on the prioritization of the audits, prioritizing OS images 131 to be upgraded and then automatically upgrading OS images 131 based on the prioritization of the OS images 131 to be upgraded, or the like), which may be considered to be a single management action or multiple management actions. The management action may include various other types of management actions which may be used to improve the set of OS images 131 available from OS image management server 130 of cloud platform 120.

The management action initiated by OS management server 150, as discussed above, may include a management action related to VMs 122 running within cloud platform 120. For example, the management action may include initiating an audit of the current state (e.g., level of staleness) of VMs 122 running within cloud platform 120 (e.g., for all VMs 122, for VMs 122 of a subset of customers of cloud platform 120, for VMs 122 running a particular OS, for VMs 122 running a particular OS image 131, for all OSs of cloud platform 120, for a subset of OSs of cloud platform 120, for a set of OS images 131 of cloud platform 120, or the like, as well as various combinations thereof), prioritizing auditing of the current state of VMs 122 running within cloud platform 120 (e.g., based on the respective OSs being used by the VMs 122, based on the respective OS images 131 being used by the VMs 122, or the like), prioritizing VMs 122 running in cloud platform 120 (e.g., in a manner for indicating which of the VMs 122 are most out-of-date (or stale) with respect to the respective OS images 131 available from OS image management server 130 since VMs 122 that are out of date with respect to the OS images 131 may be upgraded without the CP having to obtain new OS versions 111 from OS provider systems 110, in a manner for indicating which of the VMs 122 are most out-of-date (or stale) with respect to the respective OS versions 111 that are available from OS provider systems 110, or the like, as well as various combinations thereof), initiating automatic upgrades to VMs 122 running in cloud platform 120 (e.g., based on the latest OS images 131 available from OS image management server 130, by requesting the latest OS versions 111 of the OSs from OS provider systems 110 for making the latest OS versions 111 of the OSs available as OS images 131 and upgrading the VMs 122 based on the latest OS images 131, or the like), generating information indicative of the current state of VMs 122 running in cloud platform 120 (e.g., current versions of the OSs running on the VMs 122, level of staleness of VMs 122 relative to one or both of respective OS images 131 available from OS image management server 130 and respective OS versions 111 available from OS provider systems 110 for respective OSs, or the like), initiating a notification (e.g., initiating display of a message or alert on a workstation of a technician or other user of cloud platform 120, sending a text message or e-mail message to a technician or other user of cloud platform 120, or the like) for providing a technician or other user associated with cloud platform 120 with information related to VMs 122 running within the cloud platform 120 (e.g., identification of OSs requiring or potentially requiring upgrades based on numbers of VMs 122 using the respective OS images 131 of the OSS, identification of OS images 131 requiring or potentially requiring upgrades based on numbers of VMs 122 using the respective OS images 131, identification of VMs 122 requiring or potentially requiring upgrades based on level of staleness or other prioritization information, or the like), or the like, as well as various combinations thereof. The management action may include various combinations of management actions described above (e.g., prioritizing audits to be performed and then performing audits based on the prioritization of the audits, prioritizing VMs 122 to be upgraded and then automatically upgrading VMs 122 based on the prioritization of the VMs 122 to be upgraded, or the like), which may be considered to be a single management action or multiple management actions. The management action may include various other types of management actions which may be used to improve the VMs 122 running within cloud platform 120.

It will be appreciated, at least from the examples of management actions discussed herein, that various management actions which may be initiated may identify and/or address various issues or potential issues related to use of OSs on VMs 122 of cloud platform 120. For example, the CP of cloud platform 120 may be able to determine, based on the instantiation dates of VMs 122 and based on dates of events by the OS provider (e.g., dates on which OS versions 111 are made available by the OS provider) and dates of events by the CP (e.g., dates on which OS images 131 are made available by the CP), which of the VMs 122 of cloud platform 120 are potentially most at risk due to possible gaps in patch state. For example, the CP of cloud platform 120 may be able to determine, for a given OS image 131 available from OS image management server 130 running within cloud platform 120 based on the availability date of the OS image 131 and OS version information 112 for the OS, whether the OS image 131 is fresh against the most recent OS version 111 (e.g., release, patch, or the like) of the OS provider. For example, the CP of cloud platform 120 may be able to determine, for a given in-flight VM 122 running within cloud platform 120 based on the instantiation date of the given in-flight VM 122, whether the given in-flight VM 122 is likely in compliance with the OS patching recommended by the OS provider of the OS running on the given in-flight VM 122. For example, the CP of cloud platform 120 may be able to determine, for a given in-flight VM 122 running within cloud platform 120 based on the instantiation date of the given in-flight VM 122 and OS availability information (e.g., information describing the most recent OS image 131 available from OS image management server 130 and/or information describing the most recent OS version 111 available from the OS provider system 110 of the OS provider of the OS), information describing the delta of the given in-flight VM 122 relative to the OS availability information. From the foregoing examples, as well as various other descriptions and examples provided herein, it will be appreciated that various OS management functions provided by OS management server 150 for cloud platform 120 may include management for various purposes/goals, management at various levels of granularity, or the like, as well as various combinations thereof.

The OS management server 150 may be configured to perform various other OS management functions based on one or more of OS version information 112, OS image information 132, and VM OS information 142.

The OS management server 150 may be configured to produce various types of output information in providing OS management functions. For example, the OS management server 150 may produce information associated with processing of various types of received input information received (OS version information 112, OS image information 132, VM OS information 142, or the like), information associated with initiation of management actions, information associated with execution of management actions, information resulting from execution of management actions, or the like. The output information produced by OS management server 150 in providing OS management functions may be considered to be part of OS management information 152 (as illustrated in FIG. 1) or may be maintained separately (omitted from FIG. 1 for purposes of clarity).

The OS management server 150 may be configured to maintain the various types of input information that it receives and output information that it produces in various ways. The OS management server 150 may be configured to maintain the various types of input information that it receives and output information that it produces using a database (e.g., OS management server 150 may be implemented as a database server), such as database 153 depicted in FIG. 1. The OS management server 150 may be configured to maintain the various types of input information that it receives and output information that it produces using any other suitable type(s) of storage device(s), which have been omitted from FIG. 1 for purposes of clarity. Furthermore, the OS management server 150 may be configured to perform various other OS management functions within the context of cloud platform 120.

Figure 2:
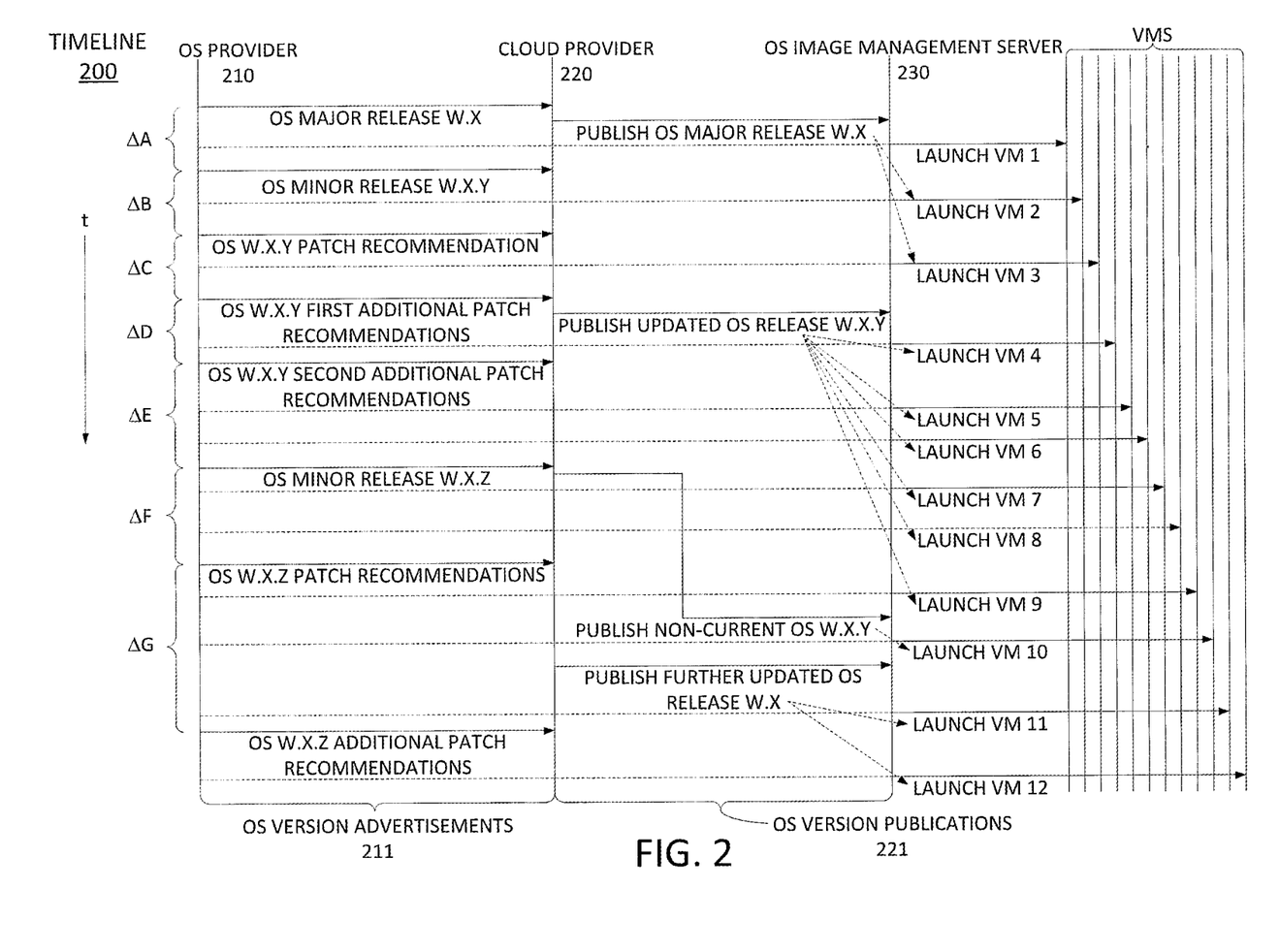
FIG. 2 is an example timeline illustrating the impact of availability of OS versions and availability of OS images on the instantiation of VMs within a cloud platform.

FIG. 2 is an example timeline illustrating the impact of availability of OS versions and availability of OS images on the instantiation of VMs within a cloud platform. It will be appreciated that, due to various factors associated with use of OSs to provide VMs within a cloud platform (e.g., OS providers may make various versions of OSs available at various times, the CP of cloud platform may not be aware of all of the various releases of OSs available from OS providers, the CP of the cloud platform may not have obtained certain versions of OSs available from OS providers for use as OS images within the cloud platform, the CP of the cloud platform may have obtained certain versions of OSs available from OS providers at various times (which may include times different than the times at which the versions of the OS were made available by the OS providers), the VMs may have been configured at instantiation time based on any of the OS images available at the time of instantiation, the OSs running on the VMs may or may not have been upgraded since the time of instantiation, and so forth), various portions of the cloud platform may be outdated (e.g., OS images available within the cloud platform may be outdated with respect to OS versions available from OS providers, VMs running in the cloud platform may be outdated with respect to OS images available within the cloud platform and with respect to OS versions available from OS providers, or the like), the extent to which various portions of the cloud platform may be outdated may vary (e.g., across OSs, OS images, VMs, or the like), and so forth. These types of deltas which may arise with use of OSs on VMs within a cloud platform may be further understood from the timeline 200, which is discussed further below.

As depicted in FIG. 2, timeline 200 depicts an OS provider 210 that advertises availability of OS versions of an OS offered by the OS provider 210. This is illustrated in FIG. 2 as OS version advertisements 211 which include OS version information (e.g., OS version information such as OS version information 112 depicted and described herein with respect to FIG. 1). As depicted in FIG. 2, OS version advertisements 211 advertise availability of eight OS versions as follows: (1) OS major release W.X, (2) OS minor release W.X.Y, (3) OS W.X.Y patch recommendation, (4) OS W.X.Y first additional patch recommendation, (5) OS W.X.Y second additional patch recommendation, (6) OS minor release W.X.Z, (7) OS W.X.Z patch recommendation, and (8) OS W.X.Z additional patch recommendation. As further depicted in FIG. 2, each OS version that is made available by OS provider 210 is different than the previous OS version made available by the OS provider, such that a VM that is running an older version of the OS is missing some set of features as compared with a newer version of the OS. This is illustrated in FIG. 2 as OS deltas between the eight OS versions advertised by OS version advertisements 211 as follows: (a) ΔA is the OS delta between OS major release W.X and OS minor release W.X.Y, (b) ΔB is the OS delta between OS minor release W.X.Y and OS W.X.Y patch recommendation, (c) ΔC is the OS delta between OS W.X.Y patch recommendation and OS W.X.Y first additional patch recommendation, (d) ΔD is the OS delta between OS W.X.Y first additional patch recommendation and OS W.X.Y second additional patch recommendation, (e) ΔE is the OS delta between OS W.X.Y second additional patch recommendation and OS minor release W.X.Z, (f) ΔF is the OS delta between OS minor release W.X.Z and OS W.X.Z patch recommendation, and (g) ΔG is the OS delta between OS W.X.Z patch recommendation and OS W.X.Z additional patch recommendation.

As depicted in FIG. 2, timeline 200 depicts a cloud provider 220 of the cloud platform. The cloud provider 220 receives the OS version advertisements 211 from OS provider 210. The cloud provider 220 of the cloud platform, however, does not purchase (or otherwise obtain) all of the OS versions advertised by and available from OS provider 210; rather, as depicted in FIG. 2, cloud provider 220 only purchases (or otherwise obtains) four of the eight OS versions and then publishes (illustrated in FIG. 2 as OS version publications 221) those four OS versions as OS images available from an OS image management server 230 of cloud provider 220. The OS version publications 221 may be initiated by a server or other system of cloud provider 220 (e.g. cloud provider 220 depicted in FIG. 2 may represent a server or other system configured to publish, or otherwise make available, OS versions from the OS provider 210 as OS images). The OS image management server 230 may operate in a manner similar to the OS image management server 130 of FIG. 1. The functions depicted and described as being performed by cloud provider 220 may be integrated into OS image management server 230. As depicted in FIG. 2. OS version publications 221 make the four OS versions from the OS provider 210 available as OS images from OS image management server 230 of cloud provider 220 as follows: (a) publication of OS major release W.X (which is published at about the same time that the OS major release W.X became available from the OS provider 210), (b) publication of OS W.X.Y first additional patch recommendation (which is published at about the same time that the OS W.X.Y first additional patch recommendation became available from the OS provider 210), (c) publication of OS minor release W.X.Z (which it not published at about the same time that the OS minor release W.X.Z became available from the OS provider 210 but, rather, is published later after the OS W.X.Z additional patch recommendation became available from the OS provider 210), and (d) publication of OS W.X.Z patch recommendation (which is published at about the same time that the OS W.X.Z additional patch recommendation became available from the OS provider 210).

As depicted in FIG. 2, example timeline 200 depicts a set of VMs (denoted as VM1-VM12) instantiated within the cloud platform by the cloud provider 220 of the cloud platform at different times. More specifically, timeline 200 depicts the timing of instantiation of the VMs relative to the availability of OS images from the cloud provider 220 and relative to the availability of the OS versions from the OS provider 210.

As depicted in FIG. 2, the timeline 200, based on information indicative of the timing of the availability of OS images from the cloud provider 220 and the timing of the availability of the OS versions from the OS provider 210, includes information indicative of the initial states of the VMs at the times at which the VMs were instantiated (or launched) within the cloud platform. The initial states of the VMs at the times of their launch are as follows. At the time of its launch, VM1 was "fresh." At the time of its launch, VM2 was "stale by $\Delta A$." At the time of its launch, VM3 was "stale by $\Delta A+B$." At the time of its launch, VM4 was "fresh." At the time of its launch, VM5 was "stale by $\Delta D$." At the time of its launch, VM6 was "stale by $\Delta D$." At the time of its launch, VM7 was "stale by $\Delta D+E$." At the time of its launch, VM8 was "stale by $\Delta D+E$." At the time of its launch, VM9 was "stale by $\Delta D+E+F$." At the time of its launch, VM10 was "stale by $\Delta F$." At the time of its launch, VM11 was "fresh." At the time of its launch, VM12 was "stale by $\Delta G$."

As depicted in FIG. 2, the timeline 200, based on intimation indicative of the timing of the availability of OS images from the cloud provider 220 and the timing of the availability of the OS versions from the OS provider 210, includes information indicative of the current states of the VMs at the times at which VM12 is instantiated (or launched) within the cloud platform. Namely, if the first eleven VMs (namely, VM1-VM11) were left running as-is and n subsequently patched then, at the time of VM12 being instantiated, the current states of the VMs would be as follows, VM1 is stale by "$\Delta A+B+C+D+E+F+G$" (most potentially unpatched and, thus, most at risk out of the twelve VMs) VM2 tale by "$\Delta A+B+C+D\pm E+F+G$" (most potentially unpatched and, thus, lost at k out of the twelve VMs). VM3 is stale by "$\Delta A+B+C+D+E+F+G$" (and, it may be seen, is most potentially unpatched and, therefore, most at risk out of the twelve VMs). VM4 is stale by "$\Delta D+E+F+G$." VM5 is stale by "$\Delta D+E+F+G$." VM6 is stale by "$\Delta D+E+F+G$." VM7 is stale by "$\Delta D+E+F+G$." VM8 is stale by "$\Delta D+E+F+G$." VM9 is stale by "$\Delta D+E+F+G$." VM10 is stale by "$\Delta F+G$." VM11 is stale by "$\Delta G$."

The timeline 200 of FIG. 2 provides an example illustrating the manner in which OS version information, OS image information, and VM OS information may be used to determine various types of information (e.g., freshness or staleness of OS images, freshness of staleness of OSs being run by VMs, or the like, as well as various combinations thereof). As discussed above, this information may be used to support various management actions, such as a management action related to upgrading the OS images made available by the cloud provider 220 within the cloud platform, a management action related to upgrading the OSs of the VMs of the cloud platform, or the like.

Figure 3:
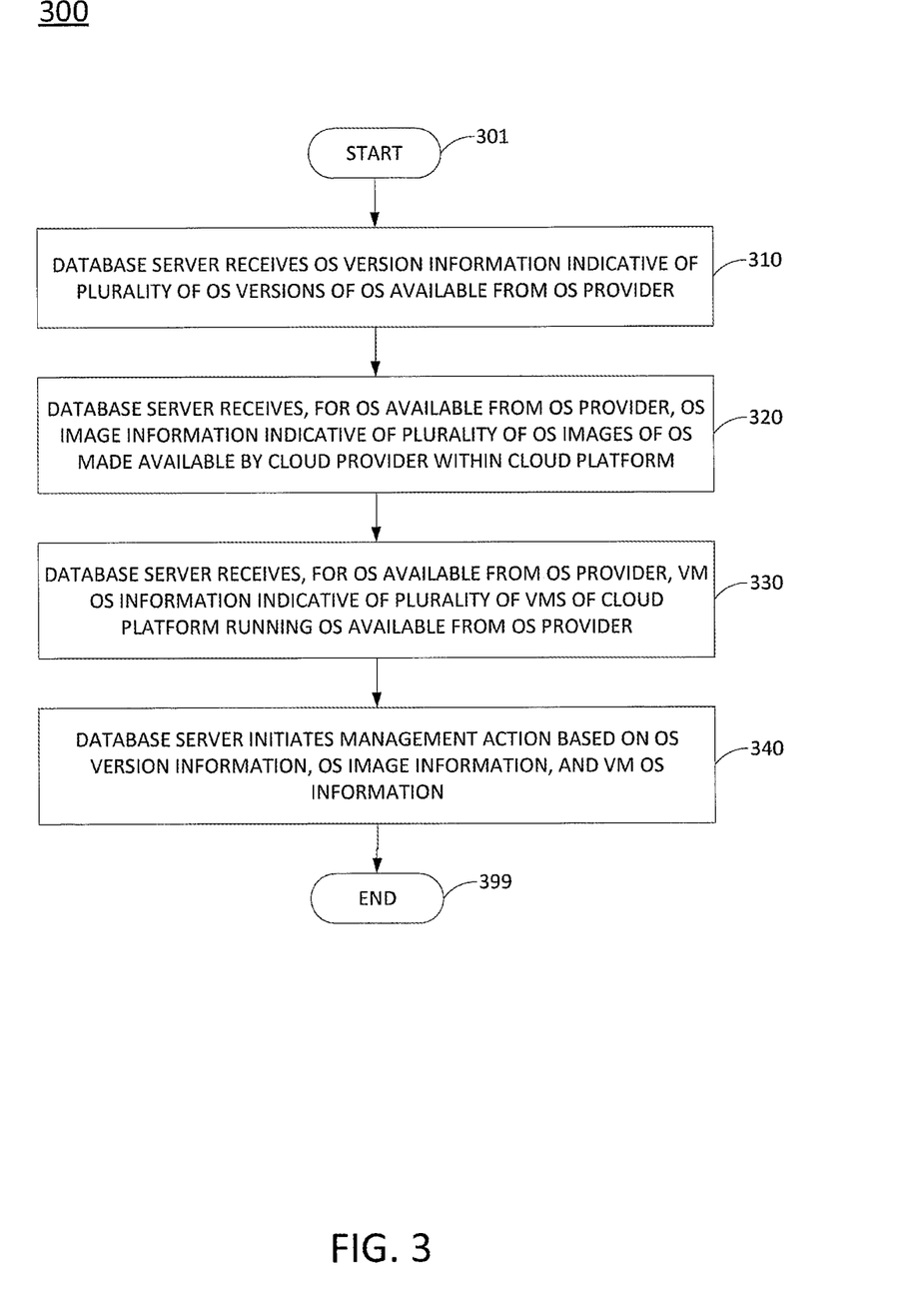
FIG. 3 is a flow diagram of an example method for OS management for a cloud platform.

FIG. 3 is a flow diagram of an example method for OS management for a cloud platform. The method 300 may be executed by an OS management server within the context of the cloud platform, such as by the OS management server 150 of the cloud platform 120 of FIG. 1. The OS management server may be implemented as a database server, and method 300 of FIG. 3 is described within this context.

At block 301, method 300 begins. At block 310, the database server receives OS version information indicative of a plurality of OS versions of an OS available from an OS provider.

At block 320, the database server receives, for the OS available from the OS provider, OS image information indicative of a plurality of OS images of the OS that are made available by the CP within the cloud platform.

At block 330, the database server receives, for the OS available from the OS provider, VM OS information indicative of a plurality of VMs of the cloud platform that are running the OS available from the OS provider.

At block 340, the database server initiates a management action based on the OS version information, the OS image information and the VM OS information. At block 399, method 300 ends.

Figure 4:
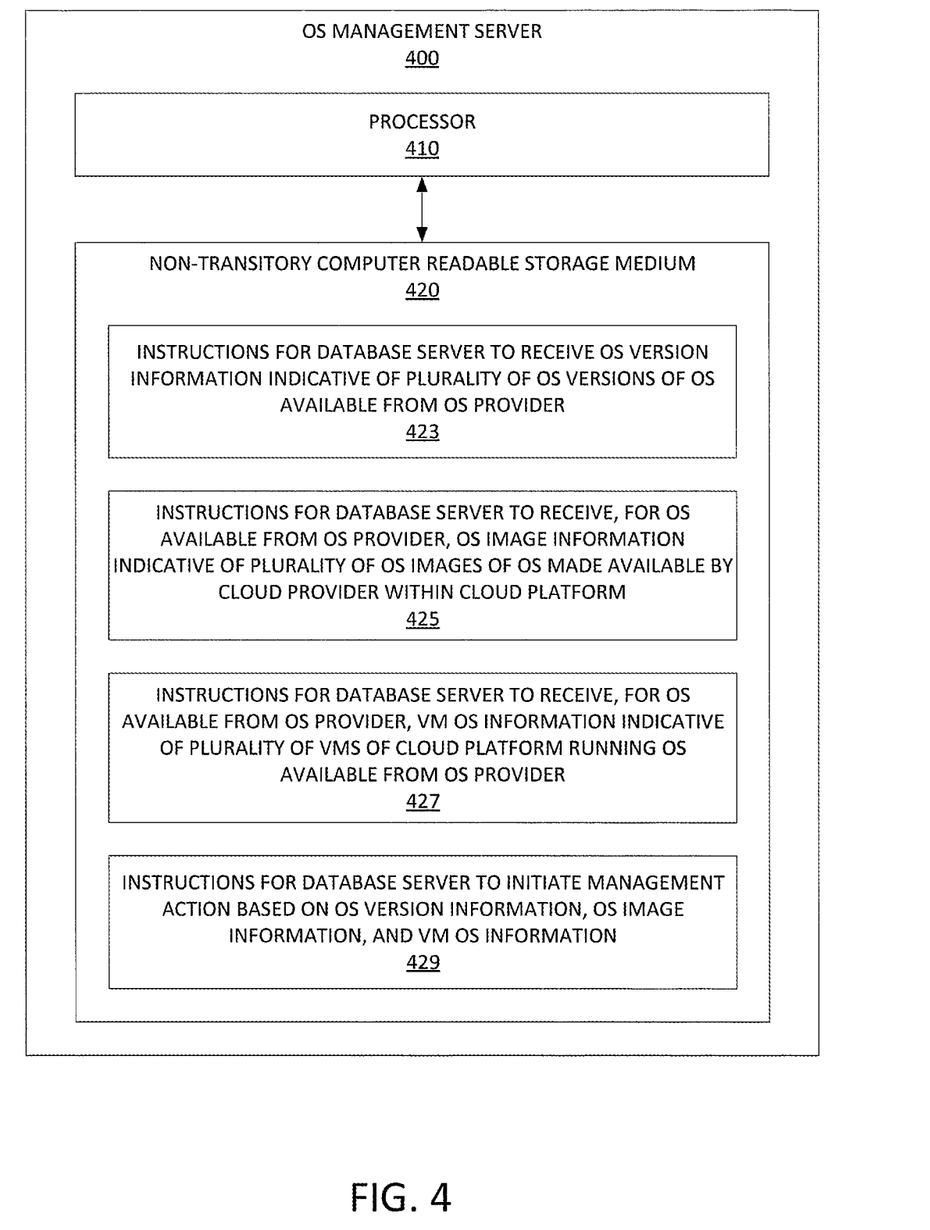
FIG. 4 is block diagram of an example OS management server of the present disclosure.

FIG. 4 is block diagram of an example OS management server of the present disclosure. The OS management server 400 may be implemented as a database server, and OS management server 400 of FIG. 4 is described within this context. The OS management server 400 includes a processor 410 and a non-transitory computer-readable storage medium 420 that is communicatively connected to processor 410. The non-transitory computer-readable storage medium 420 stores instructions 423, 425, 427 and 429 which, when executed by the processor 410, adapt the OS management server 400 to provide the functions indicated by the instructions 423, 425, 427 and 429. The instructions 423 include instructions for the database server to receive OS version information indicative of a plurality of OS versions of an OS available from an OS provider. The instructions 425 include instructions for the database server to receive, for the OS available from the OS provider, OS image information indicative of a plurality of OS images of the OS that are made available by the CP within the cloud platform. The instructions 427 include instructions for the database server to receive, for the OS available from the OS provider, VM OS information indicative of a plurality of VMs of the cloud platform that are running the OS available from the OS provider. The instructions 429 include instructions for the database server to initiate a management action based on the OS version information, the OS image information, and the VM OS information. It will be appreciated that the OS management server 400 may include venous other instructions for providing various other functions as discussed herein.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
receiving, by a database server of a cloud platform of a cloud provider (CP), operating system (OS) version information indicative of a plurality of OS versions of an OS available from an OS provider;
receiving, by the database server for the OS available from the OS provider, OS image information indicative of a plurality of OS images of the OS made available by the CP within the cloud platform;
receiving, by the database server for the OS available from the OS provider, virtual machine (VM) OS information indicative of a plurality of VMs of the cloud platform that is running the OS available from the OS provider, wherein the OS version information comprises OS version availability dates on which the respective OS versions became available from the OS provider, wherein the OS image information comprises OS image availability dates on which the respective OS images became available from the CP, wherein the VM OS information comprises VM instantiation dates on which the respective VMs were instantiated; and
initiating a management action based on the OS version information, the OS image information, and the VM OS information, wherein the management action comprises prioritizing the VMs for upgrading based on the OS version availability dates, the OS image availability dates, and the VM instantiation dates.

2. The method of claim 1, wherein the management action comprises prioritizing auditing of the plurality of VMs, auditing one of the plurality of VMs, auditing a group of the plurality of VMs, prioritizing at least a portion of the plurality of VMs for upgrading, upgrading one of the plurality of VMs, or upgrading a group of the plurality of VMs.

3. The method of claim 1, further comprising:
initiating a second management action based on the OS version information and the OS image information.

4. The method of claim 3, wherein the second management action comprises prioritizing auditing of the plurality of OS images, auditing one of the plurality of OS images, auditing a group of the plurality of OS images, prioritizing at least a portion of the plurality of OS images for upgrading, upgrading one of the plurality of OS images, or upgrading a group of the plurality of OS images.

5. The method of claim 3, wherein the OS version information comprises OS version availability dates on which the respective OS versions became available from the OS provider, wherein the OS image information comprises OS image availability dates on which the respective OS images became available from the CP, wherein the second management action comprises:
prioritizing the OS images for upgrading based on the OS version availability dates and the OS image availability dates.

6. An apparatus, comprising:
an operating system (OS) image management server to provide OS image information indicative of a plurality of OS images of an OS available from an OS provider, the plurality of OS images being de available by a cloud provider within a cloud platform;
a virtual machine (VM) management server to provide VM OS information indicative of a plurality of VMs of the cloud platform that are running the OS available from the OS provider; and
an OS management server to receive OS version information indicative of a plurality of OS versions of the OS available from the OS provider, receive the OS image information from the OS image management server, receive the VM OS information from the VM management server, wherein the OS version information comprises OS version availability dates on which the respective OS versions became available from the OS provider, wherein the OS image information comprises OS image availability dates on which the respective OS images became available from the CP, wherein the VM OS information comprises VM instantiation dates on which the respective VMs were instantiated, and to initiate a management action based on the OS version information, the OS image information, and the VM OS information, wherein the management action comprises prioritizing the VMs for upgrading based on the OS version availability dates, the OS image availability dates, and the VM instantiation dates.

7. The apparatus of claim 6, wherein the management action comprises prioritizing auditing of the plurality of VMs, auditing one of the plurality of VMs, auditing a group of the plurality of VMs, prioritizing at least a portion of the plurality of VMs for upgrading, upgrading one of the plurality of VMs, or upgrading a group of the plurality of VMs.

8. The apparatus of claim 6, the OS management server further to:
initiate a second management action based on the OS version information and the OS image information.

9. The apparatus of claim 8, wherein the second management action comprises prioritizing auditing of the plurality of OS images, auditing one of the plurality of OS images, auditing a group of the plurality of OS images, prioritizing at least a portion of the plurality of OS images for upgrading, upgrading one of the plurality of OS images, or upgrading a group of the plurality of OS images.

10. The apparatus of claim 8, wherein the OS version information comprises OS version availability dates on which the respective OS versions became available from the OS provider, wherein the OS image information comprises OS image availability dates on which the respective OS images became available from the CP, wherein the second management action comprises:
prioritizing the OS images for upgrading based on the OS version availability dates and the OS image availability dates.

11. A non-transitory computer-readable storage medium encoded with instructions executable by a processor of a database server of a cloud platform of a cloud provider (CP), the non-transitory computer-readable storage medium comprising:

instructions to receive operating system (OS) version information indicative of a plurality of OS versions of an OS available from an OS provider;

instructions to receive OS image information indicative of a plurality of OS images of the OS made available by the CP within the cloud platform;

instructions to receive virtual machine (VM) OS information indicative of a plurality of VMs of the cloud platform that are running the OS available from the OS provider, wherein the OS version information comprises OS version availability dates on which the respective OS versions became available from the OS provider, wherein the OS image information comprises OS image availability dates on which the respective OS images became available from the CP, wherein the VM OS information comprises VM instantiation dates on which the respective VMs were instantiated; and instructions to initiate a management action based on the OS version information, the OS image information, and the VM OS information wherein the management action comprises prioritizing the VMs for upgrading based on the OS version availability dates, the OS image availability dates, and the VM instantiation dates.

12. The non-transitory computer-readable storage medium of claim 11, wherein the management action comprises prioritizing auditing of the plurality of VMs, auditing one of the plurality of VMs, auditing a group of the plurality of VMs, prioritizing at least a portion of the plurality of VMs for upgrading, upgrading one of the plurality of VMs, or upgrading a group of the plurality of VMs.

13. The non-transitory computer-readable storage medium of claim 11, further comprising:

instructions to initiate a second management action based on the OS version information and the OS image information;

wherein the second management action comprises prioritizing auditing of the OS images, auditing one of the OS images, auditing a group of the OS images, prioritizing at least a portion of the OS images for upgrading, upgrading one of the OS images, or upgrading a group of the OS images.

* * * * *